(12) United States Patent
Gilbert (10) Patent No.: US 9,216,329 B2
(45) Date of Patent: Dec. 22, 2015

(54) GOLF CLUB GROOVE CONFIGURATION

(71) Applicant: Acushnet Company, Fairhaven, MA (US)

(72) Inventor: Peter J. Gilbert, Pinehurst, NC (US)

(73) Assignee: Acushnet Company, Fairhaven, MA (US)

(*) Notice: Subject to any disclaimer, the term of this patent is extended or adjusted under 35 U.S.C. 154(b) by 0 days.

(21) Appl. No.: 14/306,188

(22) Filed: Jun. 16, 2014

(65) Prior Publication Data

US 2014/0352391 A1    Dec. 4, 2014

Related U.S. Application Data

(63) Continuation of application No. 12/493,540, filed on Jun. 29, 2009, now Pat. No. 8,752,271, which is a continuation-in-part of application No. 12/477,570, filed on Jun. 3, 2009, now Pat. No. 7,976,405, which is a continuation-in-part of application No. 11/711,096, filed on Feb. 27, 2007, now Pat. No. 7,568,983, which is a continuation-in-part of application No. 10/902,064, filed on Jul. 30, 2004, now Pat. No. 7,273,422.

(60) Provisional application No. 60/528,708, filed on Dec. 12, 2003.

(51) Int. Cl.
| *B23P 17/00* | (2006.01) |
| *A63B 53/00* | (2015.01) |
| *A63B 53/04* | (2015.01) |
| *B21D 53/00* | (2006.01) |

(52) U.S. Cl.
CPC ............. *A63B 53/047* (2013.01); *A63B 53/04* (2013.01); *B21D 53/00* (2013.01); *A63B 53/0466* (2013.01); *A63B 2053/0408* (2013.01); *A63B 2053/0445* (2013.01); *A63B 2209/00* (2013.01); *Y10T 29/4998* (2015.01); *Y10T 29/49988* (2015.01); *Y10T 29/49989* (2015.01)

(58) Field of Classification Search
USPC .............. 29/527.6, 527.5, 527.1, 90.01, 90.6, 29/893.34; 473/330, 331; 72/406, 402
See application file for complete search history.

(56) References Cited

U.S. PATENT DOCUMENTS

| 1,732,136 | A |   | 6/1903  | Taylor |
| 1,052,193 | A |   | 2/1913  | Vogt |
| 1,536,616 | A |   | 5/1925  | Manning |
| 1,830,926 | A |   | 11/1931 | Burnishing |
| 3,872,701 | A |   | 3/1975  | Tersch |
| 4,355,685 | A | * | 10/1982 | Beck ............................ 166/240 |
| 4,413,825 | A |   | 11/1983 | Sasse |
| 4,508,349 | A |   | 4/1985  | Gebauer et al. |
| 4,529,203 | A |   | 7/1985  | Ribaudo |
| 4,858,929 | A |   | 8/1989  | Long |
| 4,869,508 | A |   | 9/1989  | Miller |
| 4,902,016 | A |   | 2/1990  | Boone |

(Continued)

FOREIGN PATENT DOCUMENTS

JP            59010435 A  *  1/1984  .............. B21H 7/00

*Primary Examiner* — Essama Omgba
(74) *Attorney, Agent, or Firm* — Michael J. Mancuso (57) ABSTRACT

A golf club head, and a method of making the golf club head, with an improved striking surface. The grooves are formed in the strike surface with tight tolerances. The grooves may contain a plurality of portions, including a radiused or angled portion, a portion having substantially parallel walls, and a portion having a v-shape.

15 Claims, 7 Drawing Sheets

(56) References Cited

U.S. PATENT DOCUMENTS

| | | |
|---|---|---|
| 5,437,088 A | 8/1995 | Igarashi |
| 5,591,092 A | 1/1997 | Gilbert |
| 5,676,605 A | 10/1997 | Kobayashi |
| 5,688,186 A | 11/1997 | Michael et al. |
| 5,709,616 A | 1/1998 | Rife |
| 5,735,755 A | 4/1998 | Kobayashi |
| 5,755,626 A | 5/1998 | Shira |
| 6,099,414 A | 8/2000 | Kusano et al. |
| 6,183,381 B1 | 2/2001 | Grant et al. |
| 6,224,497 B1 | 5/2001 | Antonious |
| 6,286,209 B1 | 9/2001 | Mitra et al. |
| 6,443,856 B1 * | 9/2002 | Galloway et al. ............ 473/330 |
| 6,733,400 B2 | 5/2004 | Sherwood |
| 6,739,984 B1 | 5/2004 | Ciasullo |
| 6,814,673 B2 | 11/2004 | Wahl et al. |
| 6,890,270 B2 | 5/2005 | Ciasullo |
| 7,014,568 B2 | 3/2006 | Pelz |
| 7,056,226 B2 | 6/2006 | Kennedy |
| 7,156,751 B2 | 1/2007 | Wahl et al. |
| 7,273,422 B2 | 9/2007 | Vokey et al. |
| 7,568,983 B2 | 8/2009 | Gilbert |
| 7,686,734 B2 | 3/2010 | Mordukhovich et al. |
| 7,780,548 B2 | 8/2010 | Solheim |
| 7,832,070 B2 | 11/2010 | Mordukhovich |
| 7,874,936 B2 | 1/2011 | Chao |
| 7,905,797 B2 | 3/2011 | Gilbert et al. |
| 7,905,798 B2 | 3/2011 | Petersen et al. |
| 7,918,747 B2 | 4/2011 | Johnson et al. |
| 7,927,230 B2 | 4/2011 | Solheim |
| 7,955,189 B2 | 6/2011 | Vokey et al. |
| 7,976,404 B2 | 7/2011 | Golden et al. |
| 7,976,405 B2 | 7/2011 | Gilbert et al. |
| 7,976,406 B2 | 7/2011 | Gilbert et al. |
| 8,118,688 B2 | 2/2012 | Nakamura |
| 8,172,699 B2 | 5/2012 | Nakamura |
| 8,210,966 B2 | 7/2012 | Gilbert et al. |
| 8,752,271 B2 | 6/2014 | Gilbert |
| 2002/0042306 A1 | 4/2002 | Chappell |
| 2002/0049095 A1 * | 4/2002 | Galloway et al. ............ 473/330 |
| 2003/0126734 A1 | 7/2003 | Takeda |
| 2003/0176152 A1 | 9/2003 | Lugt et al. |
| 2004/0000277 A1 * | 1/2004 | Motohashi ................. 123/90.39 |
| 2004/0000278 A1 * | 1/2004 | Motohashi ................. 123/90.39 |
| 2004/0087387 A1 | 5/2004 | Wahl et al. |
| 2004/0214654 A1 | 10/2004 | Pelz |
| 2005/0085315 A1 | 4/2005 | Wahl et al. |
| 2006/0154739 A1 | 7/2006 | Mann et al. |
| 2007/0298905 A1 | 12/2007 | Knuth |
| 2009/0163296 A1 | 6/2009 | Chao |
| 2009/0305812 A1 | 12/2009 | Nakamura |
| 2010/0113180 A1 | 5/2010 | Nakamura |
| 2010/0304890 A1 | 12/2010 | Dill et al. |
| 2012/0322574 A1 | 12/2012 | Solheim et al. |
| 2013/0217513 A1 * | 8/2013 | Amano et al. ............ 473/331 |
| 2013/0225319 A1 * | 8/2013 | Kato ............................ 473/331 |
| 2013/0260912 A1 * | 10/2013 | Jertson et al. ................ 473/330 |
| 2013/0303303 A1 * | 11/2013 | Ban ............................ 473/331 |
| 2013/0344984 A1 | 12/2013 | Golden et al. |

* cited by examiner

GOLF CLUB GROOVE CONFIGURATION

CROSS-REFERENCE TO RELATED APPLICATIONS

This is a continuation of U.S. patent application Ser. No. 12/493,540, filed Jun. 29, 2009, now U.S. Pat. No. 8,752,271, which is continuation-in-part of U.S. patent application Ser. No. 12/477,570, filed on Jun. 3, 2009, now U.S. Pat. No. 7,976,405, which is a continuation-in-part of U.S. patent application Ser. No. 11/711,096, filed on Feb. 27, 2007, now U.S. Pat. No. 7,568,983, which is a continuation-in-part of U.S. patent application Ser. No. 10/902,064, filed on Jul. 30, 2004, now U.S. Pat. No. 7,273,422, which are incorporated herein by reference in their entireties.

This application claims the benefit of U.S. Provisional Patent Application No. 60/528,708 filed on Dec. 12, 2003, which is incorporated herein by reference in its entirety.

BACKGROUND OF THE INVENTION

1. Field of the Invention

The present invention relates to golf clubs. In particular, the present invention relates to a golf club head having an improved striking surface.

2. Description of the Related Art

Golf club heads come in many different forms and makes, such as wood- or metal-type, iron-type (including wedge-type club heads), utility- or specialty-type, and putter-type. Each of these styles has a prescribed function and make-up.

Iron-type and utility-type golf club heads generally include a front or striking face, a top line, and a sole. The front face interfaces with and strikes the golf ball. A plurality of grooves, sometimes referred to as "score lines," is provided on the face to assist in imparting spin to the ball. The top line is generally configured to have a particular look to the golfer and to provide structural rigidity for the striking face. A portion of the face may have an area with a different type of surface treatment that extends fractionally beyond the score line extents. Some club heads have the surface treatment wrap onto the top line. The sole of the golf club is particularly important to the golf shot because it contacts and interacts with the ground during the swing.

In conventional sets of iron-type golf clubs, each club includes a shaft with a club head attached to one end and a grip attached to the other end. The club head includes a face for striking a golf ball. The angle between the face and a vertical plane is called the loft angle.

The United States Golf Association (USGA) publishes and maintains the Rules of Golf, which govern golf in the United States. Appendix II to the USGA Rules provides several limitations for golf clubs. For example, the width of a groove cannot exceed 0.035 inch, the depth of a groove cannot exceed 0.020 inch, and the surface roughness within the area where impact is intended must not exceed that of decorative sand-blasting or of fine milling. The Royal and Ancient Golf Club of St Andrews, which is the governing authority for the rules of golf outside the United States, provides similar limitations to golf club design.

U.S. Pat. No. 6,814,673 is directed to grooves for iron-type golf clubs.

SUMMARY OF THE INVENTION

The present invention relates to golf clubs. In particular, the present invention relates to a golf club head having an improved striking surface. The golf club head of the present invention has a flat striking face, preferably being milled. This allows a greater degree of flatness than typically seen. Preferably, the face is flat within ±0.002 inch. Grooves or score lines are then cut into the flattened face. Typically, grooves are formed in the face as part of the head-forming process. For example, if the head is cast, typical grooves are formed as part of the casting process. The face—including the grooves—is then subject to post-casting process steps, such as polishing. Similar finishing steps are also typically performed on club heads that are formed by forging. Machining grooves in the face after it has been milled beneficially saves them from being affected by any face post-manufacturing processes, which can adversely affect, for example, the groove-face interface, making it inconsistent along the length of the groove.

Preferably, the grooves are angled or otherwise ramped from their maximum depth into the face to the face surface at the groove ends. This helps facilitate cleaning sand, dirt, and other debris from the grooves. This may be characterized in a variety of manners. For example, the maximum depth distance of the groove (that is, the non-ramped, or non-radiused, portion of the groove) versus the overall length of the groove. In one preferred embodiment, the overall groove length is at least 0.25 inch longer than the maximum depth distance. As another example, the grooves may be radiused at toe and heel portions of the golf club head, a preferred radius range being from 0.125 inch to 5 inches. The maximum depth of the grooves may be about 0.02 inch deep at a geometric center of the face.

The grooves of the present invention preferably are formed by spin milling or fly cutting. Forming the grooves in this manner allows for tighter draft angles, increases the rate of production, and allows for tighter tolerances than casting or forging. Preferably, the draft angle of the inventive grooves is between about 0.5° and 12°. The grooves may be formed by a round cutter, preferably having a diameter from 3/8 inch to 3/4 inch. A preferred draft angle range is from about 0.5° to 12°.

The surface of the club face may be textured or roughened. Providing a textured strike face allows the golfer to apply more friction to the ball during use, allowing the golfer to put more spin on the ball and have greater control of the ball. Preferably, the surface has a substantially uniform textured surface with a roughness greater than 40 Ra. The face may be selectively textured to enhance certain shots that the golfer may perform. This may include providing a plurality of distinct sets of texturing to accommodate a plurality of different shots. This selectively directional texturing may include the texturing step, preferably milling, in a single direction.

The present invention also includes a method of making the golf club head described above. One preferred method includes forming a golf club head in known fashion, such as casting or forging. The strike face, which does not yet contain any grooves, is then machined to be substantially flat. Grooves are then machined in the face, and the face is roughened. These last two steps may be performed individually, in either order, or they may be performed simultaneously.

The club head of the present invention may contain grooves having a plurality of portions. A first portion adjacent to and interacting with the club head strike face may be radiused or angled relative to the strike face. A second portion, adjacent to the first portion, may be defined by substantially parallel walls that are substantially perpendicular to the strike face. A third portion may have an v-shape and be angled at approximately 90°. A fourth section may be curved, having a small radius, to join the walls of the third portion.

DESCRIPTION OF THE DRAWINGS

The present invention is described with reference to the accompanying drawings, in which like reference characters reference like elements, and wherein.

DETAILED DESCRIPTION OF THE INVENTION

Other than in the operating examples, or unless otherwise expressly specified, all of the numerical ranges, amounts, values and percentages such as those for amounts of materials, moments of inertias, center of gravity locations, loft and draft angles, and others in the following portion of the specification may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

Figure 1:
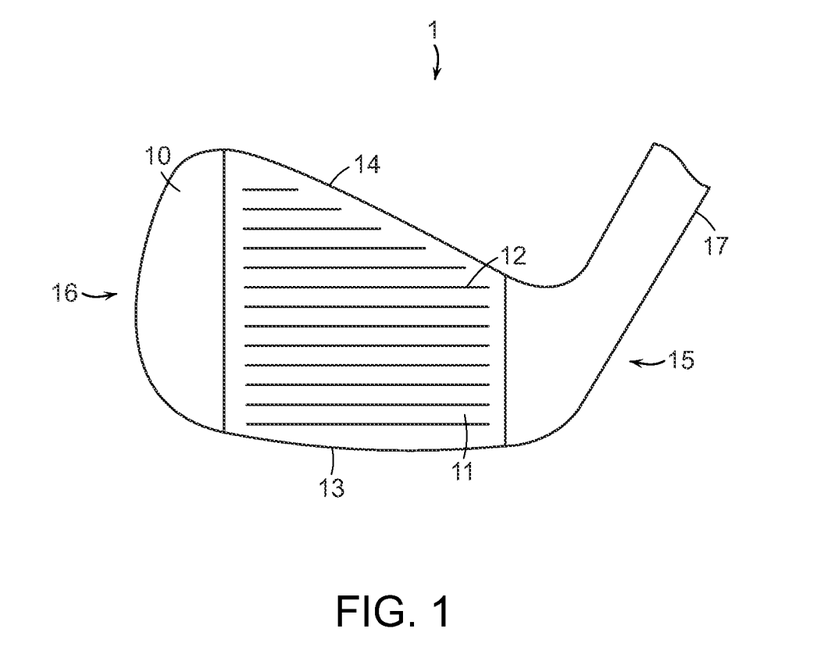
FIG. 1 shows a golf club head of the present invention.

The present invention is directed to a golf club head with an improved striking surface. FIG. 1 shows a golf club head 1 of the present invention. The golf club head 1 includes a body 10 defining a front surface 11, a sole 13, a top line 14, a heel 15, a toe 16, and a hosel 17. The striking face of the front surface 11, which contains grooves 12 therein, and the sole 13 may be unitary with the body 10, or they may be separate bodies, such as inserts, coupled thereto. While the club head 1 is illustrated as an iron-type golf club head, the present invention may also pertain to a utility-type golf club head or a wood-type club head.

Figure 2:
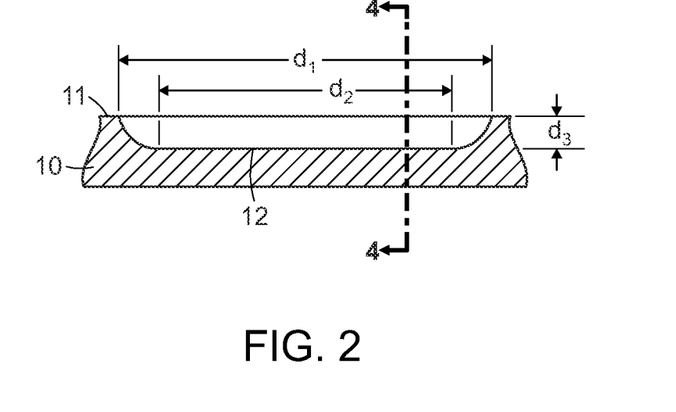
FIG. 2 shows a cross-sectional view of a club head of the present invention along a groove.

FIG. 2 shows a cross-sectional view of the club head 1 along a groove 12. Grooves 12 are machined into the surface of the striking face 11, which allows the draft angle to be decreased. Grooves 12 extend from a toe end of the club head 1 to a heel end of the club head 1. The grooves 12 are shallow at both the toe and heel portions of the club head 1, and are deep in the central regions. Grooves 12 have a first distance d1 measured along the surface of striking face 11 and a second distance d2 measured along the deepest portion of the grooves, which have a depth d3. Thus, first distance d1 is an overall distance and second distance d2 is a maximum depth distance. Preferably, the groove depth along the maximum depth distance d2 is substantially constant. In one embodiment the maximum depth distance d2 is at least 0.25 inch shorter than the overall distance d1. The groove draft angle $\alpha$ ranges from about 0.5° to 12°, more preferably about from 4° to 6°, and most preferably 5°.

Figure 3:
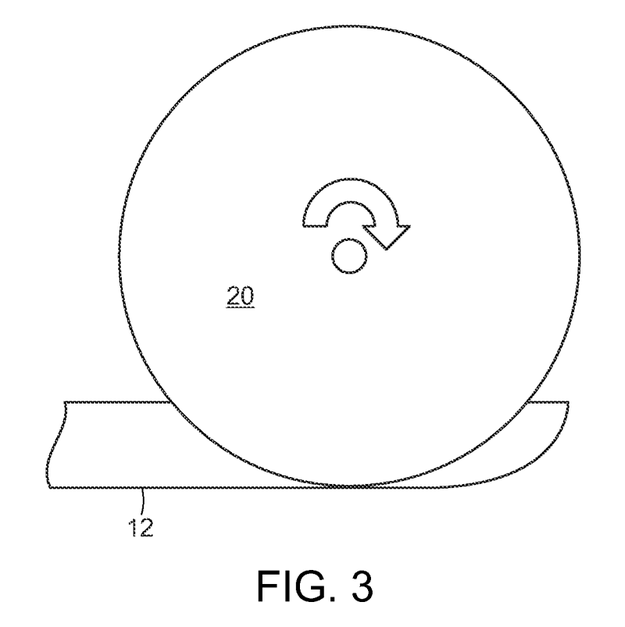
FIG. 3 shows a preferred groove cutting setup.

Grooves 12 are radiused at the toe and heel portions of the club head 1, and are about 0.02 inch deep at a geometric center of the face 11. Grooves 12 are machined into the strike face surface 11. The club head 1 is retained in a mold, which preferably is formed of a material soft enough to not damage the club head 1 yet resilient enough to firmly retain the golf club head 1, and a cutter, preferably a round cutter or a saw cutter, is used to form the grooves 12. As shown, the toe and heel portions are radiused about an axis of rotation that is perpendicular to a longitudinal axis of the groove. Furthermore, that axis of rotation is approximately parallel to face 11 of club head 1. Preferred cutters have a diameter from ⅜ inch to ¾ inch. A preferred range of groove radii include from 0.125 inch to 5 inches, with 0.25 inch to 2.5 inches being more preferred. Having radiused grooves 12 facilitates removal of dirt, grass, sand, and other materials that typically become embedded within the grooves of a golf club during normal use by eliminating corners that can trap these materials. FIG. 3 shows a preferred groove cutting setup illustrating cutter 20 with groove 12.

Figure 4:
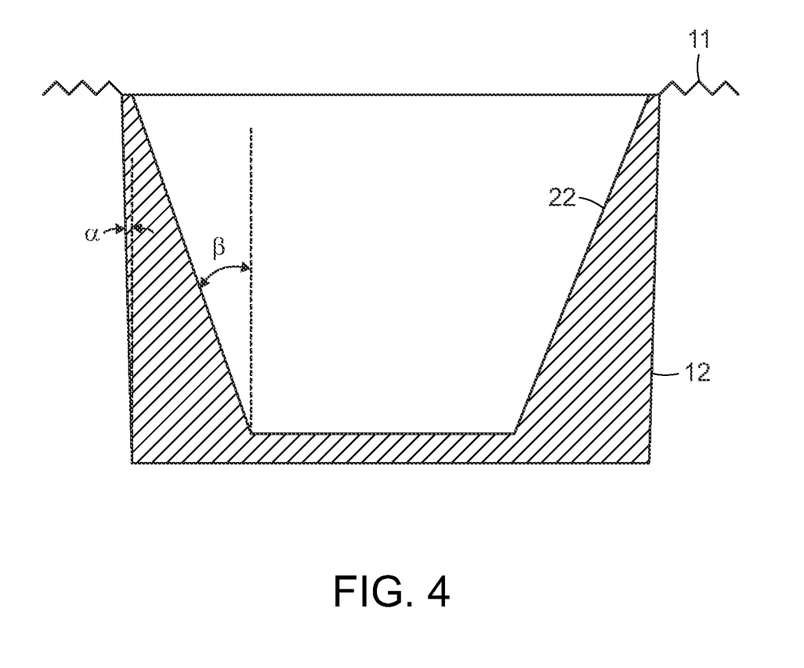
FIG. 4 shows a comparison of a groove of the golf club head of FIG. 1 as viewed along lines 4-4 of FIG. 2 with a known groove.

Machining the grooves 12, in addition to decreasing the draft angle, increases the rate of production and allows for tighter tolerances than casting or forging. The rate of production is increased by decreasing the number of required manufacturing steps. Instead of inserting the tool into the club face, machining the grooves, and removing the tool from the club face in three separate steps, as required by known groove creating processes, the present invention allows all three to be combined into one step. This is possible because the turning axis of the present cutter is parallel to the face, rather than the perpendicular axes of known processes. By orienting the turning axis of the cutter so that it is parallel to the face allows the groove profile to be created by building that profile into the edge of the cutter. As a result, complex groove geometries and tightly controlled dimensions, including the edge radius, may be created. The tighter tolerances possible with the present invention allow less material to be removed, also decreasing manufacturing time. FIG. 4 shows a comparison of a groove 12 of the present invention with a typical groove 22 of known golf club heads. The groove 12 preferably has a depth of 0.02 inch, which is the USGA limit. Due to loose tolerances, known grooves 22 were designed well short of this limit. Similarly, known manufacturing processes required a large draft angle $\beta$, typically around 16°. The draft angle $\alpha$ of grooves 12 is much smaller, increasing the cross-sectional area of the groove and groove volume for a given length.

As noted above, the governing bodies of golf place limitations on the geometry of grooves 12. The increased tolerance control afforded by machining the grooves 12 of the present invention allows the actual groove geometry to be closer to the limits than was previously achievable. Thus, the grooves 12 of the present invention maximize groove volume, enhancing the groove performance during use. With the improved grooves of the present invention, the grooves better grip the ball, allowing a golfer to apply more spin to the ball. The golfer's control over the ball, both during ball flight and subsequent to flight, such as when landing and settling on a golf green, are increased. The grooves 12 of the present invention also result in a golf club head that is more aesthetically pleasing and that allows better ball control.

Figure 5:
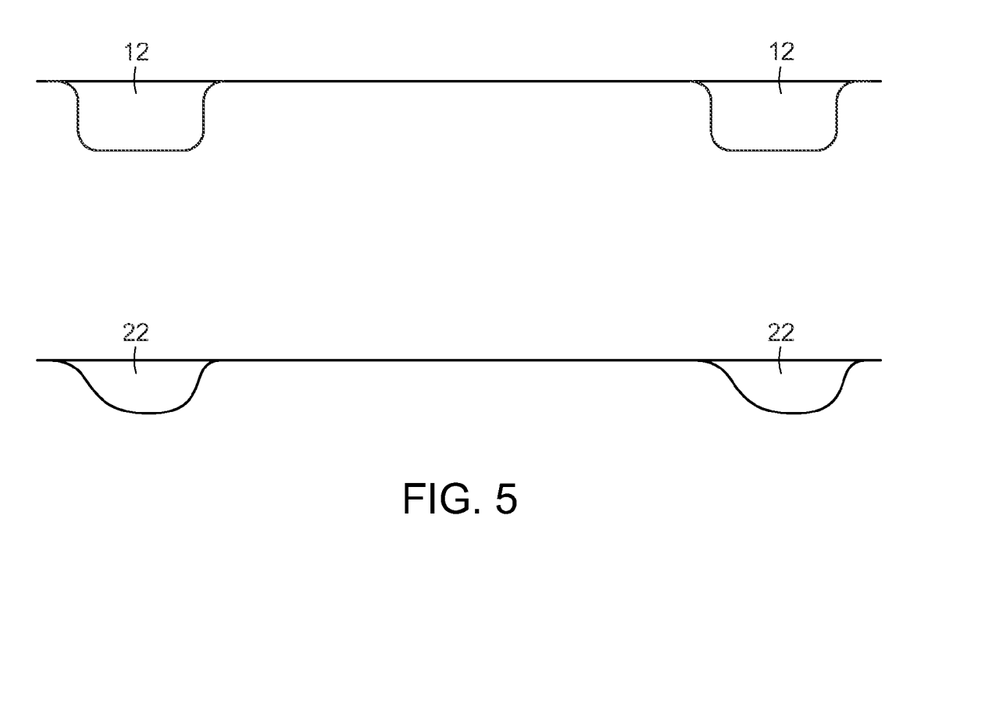
FIG. 5 shows a comparison of a groove of the golf club of FIG. 1 and a known groove.
Figure 6:
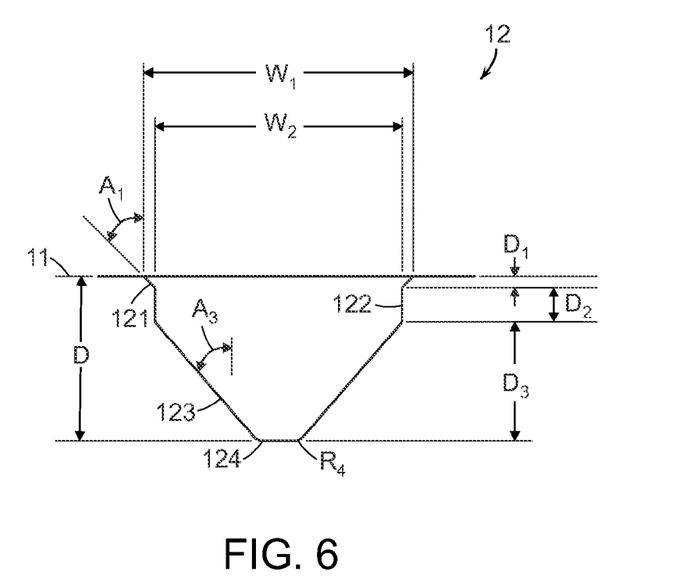
FIGS. 6-10 each show a cross-section of a preferred groove of the present invention.
Figure 7:
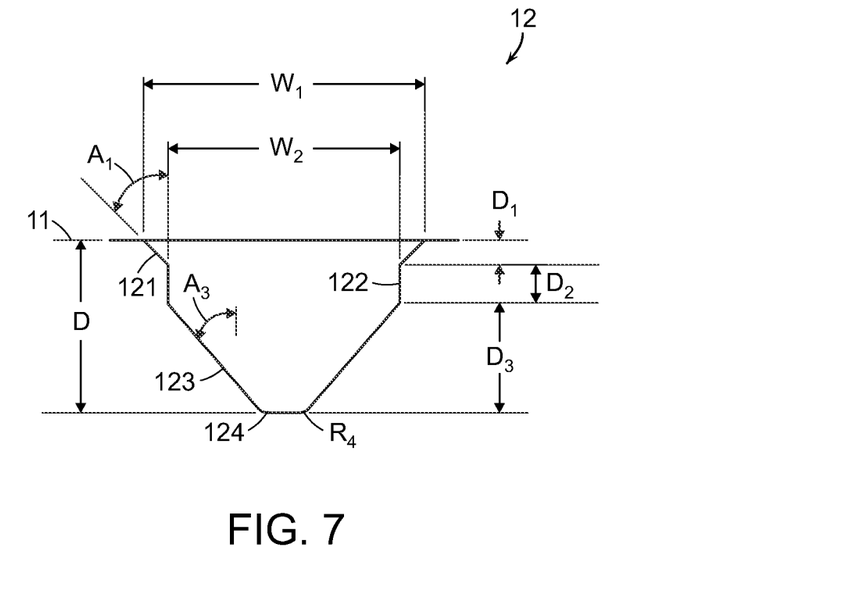
Figure 8:
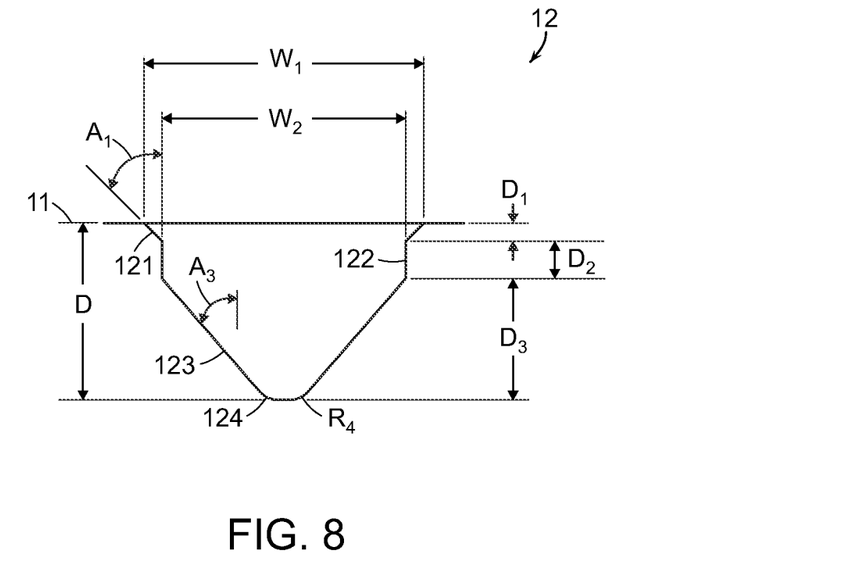
Figure 9:
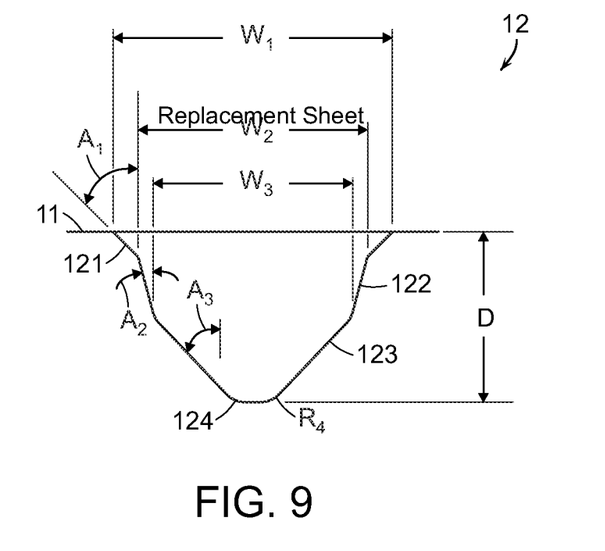

FIG. 5 shows a comparison of a groove 12 of the present invention with a typical groove 22 of known golf club heads. The known grooves 22 are quite rounded. The grooves 12 of the present invention, however, are much sharper. The edges are more defined, the depth is greater, and the dimensions are more consistent and closer to the limits. All of these factors allow the golf club head 1 to better grip the golf ball, increasing the user's control over the ball.

The face 11 of the club head 1 of the present invention is also enhanced to provide additional ball control and enhanced performance. The strike surface 11 is provided with a roughened texture. A common measure of roughness in surface finish is average roughness, Ra. Ra, also known as Arithmetic Average (AA) and Center Line Average (CLA), is a measure of the distance from the peaks and valleys to the center line or mean. It is calculated as the integral of the absolute value of the roughness profile height over the evaluation length:

$$Ra = \frac{1}{L}\int_0^L |r(x)|\,dx$$

The face 11 is roughened by machining, preferably with a Computer Numerically Controlled (CNC) mill. Known golf clubs have a face roughness at most 40 Ra. At least a portion of the face 11 in the proximity of the grooves, and more preferably the entire face 11, is machined such that it has a substantially uniform textured surface with a roughness greater than 40 Ra. Preferably, the roughness is from 75 Ra to 300 Ra, more preferably from 100 Ra to 200 Ra, and most preferably from 120 Ra to 180 Ra.

Providing a textured strike face allows the golfer to apply more friction to the ball during use, allowing the golfer to put more spin on the ball and have greater control of the ball. Conventionally, golfers have to take a full swing to induce enough golf ball spin to control the ball movement on a golf green. With the golf club head of the present invention, a golfer can induce golf ball spin in "partial" shots, or shots when the golfer is not taking a full swing. The textured strike surface of the present invention also distributes the shear force resulting from the golf swing over a greater area of the golf ball. This reduces cover damage and extends golf ball life.

The golf club head 1 preferably is formed of a soft base metal, such as a soft carbon steel, 8620 carbon steel being an example. A chrome finish may be applied to the base metal to inhibit wear and corrosion of the base metal. If included, the chrome finish preferably includes a non-glare layer. The chrome finish layer preferably has a thickness between 0.005 μin and 280 μin, with 80 μin a preferred thickness. A nickel finish may additionally be applied to the base metal as a sub-layer for chrome or another finish layer or may alternatively be applied to the base metal as the finish layer. If included, the nickel finish preferably has a thickness between 400 μin and 1200 μin, with 800 μin a preferred thickness.

In use, the grooves 12 and strike face 11 of the present invention enhance performance, especially in adverse conditions. The higher friction possible with the golf club head 1 allows a tighter grip on the golf ball during "wet" or "grassy" conditions than was previously possible. The club head of the present invention was tested, and as shown in Table 1 below, the generated revolutions per minute of a struck golf ball were substantially the same as those generated with a conventional club for a full dry shot, but were increased in a half dry shot and in both a full wet shot and a half wet shot. The "dry" shots contained substantially no moisture on the club face and ball. For the "wet" shots, the club face and/or the golf ball surface were sprayed with water in an amount that would be typical for shots made during a round in dewy or rainy conditions. A 60° wedge was used in these tests. Table 1 shows the revolutions per minute of a golf ball after being struck with a standard club or a spin milled club of the present invention, and illustrates the benefit of the spin milled grooves over standard grooves.

TABLE 1

| Shot Conditions | Standard | Spin Milled |
| --- | --- | --- |
| Dry - full | 12250 | 12000 |
| Dry - half | 6500 | 7750 |
| Wet - full | 8000 | 12000 |
| Wet - half | 4000 | 8000 |

Figure 11:
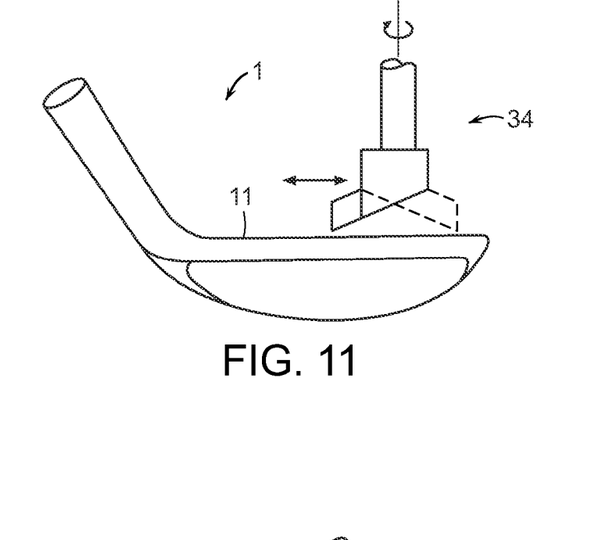
FIG. 11 illustrates a step in a method of making grooves in accordance with the present invention.

A preferred method of making the club head 1 includes first making a club head body. This may be done by casting, forging, or any other manufacturing method. The face is then machined such that it is substantially smooth and flat, preferably flat within ±0.002 inch. This preferably may be done by fly-cutting the face, which is cutting with a single-point tool fixed to the end of an arm protruding from a vertical milling shaft. For example, a fly-cutter may be used to create a flat face, as shown in FIG. 11. Having a flat face allows the golfer to achieve consistent results during use. The body preferably is nested during the face flattening process. That is, the body is retained within a housing such that it is substantially immobile. The face is left exposed so that it can be worked on. The housing may be padded or otherwise designed such that it does not damage the club head.

Once the requisite face flatness has been achieved, the grooves are created and the surface is roughened as described above. While it is preferred that the grooves be spin milled prior to roughening the surface, the order of these steps is not essential. In fact, it is possible that they be performed substantially simultaneously, or with at least some amount of overlap.

The spin milled grooves may have very sharp edges, which could have an adverse effect on a golf ball during use. Thus, the grooves may be deburred to remove any sharp edges in the groove-to-face junction. This creates a radius at the junction, the radius preferably being less than 0.01 inch. This deburring can be carried out in a variety of ways. The junction may be filed, such as with a wire brush or a file, such as a carbide file. In conjunction with filing, or as an alternative method, the junction can be deburred by blasting. This may include impacting small beads at the junction at high speeds. To protect the face of the club head, which may have already been roughened above 40 Ra, the face may be masked. Masking includes placing a physical barrier on the face adjacent the grooves such that the projected particles cannot impact the face. Alternatively or in conjunction with masking, a nozzle can be used to accurately direct the projected material only at the junction. As a still further alternative, or additionally, a cutting tool that includes the desired edge profile may be utilized. For example, the profile of the cutting tool may be configured to match the desired groove profile.

Another process that may be employed in the method of making club head 1 is using a forming, or shaping, die to alter the dimensions of rough cut grooves by displacing material adjacent the rough cut grooves. Generally, grooves in the face of a golf club are difficult to manufacture to tight tolerances which makes it difficult to create repeatable, highly precise groove dimensions. Additionally, it makes it difficult to mass-produce golf clubs that take full advantage of the exacting standards of the rules placed on grooves by the USGA and the R&A. According to the present invention, a precisely shaped die is pressed or stamped into a rough cut groove to alter desired attributes of the groove. The die is made to very tight tolerances so that the resultant groove has dimensions that are tightly controlled. The die may be used to alter a particular portion of the groove or it may be used to alter the entire groove geometry.

Figure 12:
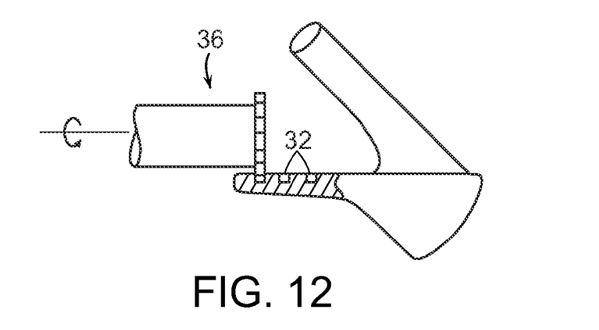
FIG. 12 illustrates another step in a method of making grooves in accordance with the present invention.
Figure 13:
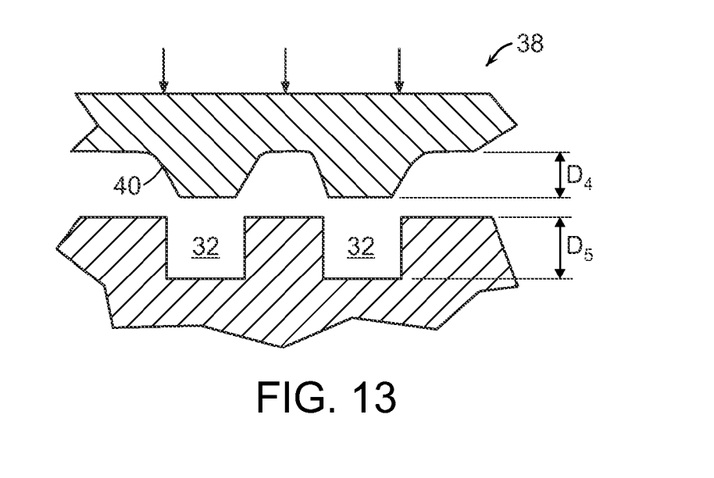
FIG. 13 illustrates an embodiment of another step in a method of making grooves in accordance with the present invention.

A method of producing a groove using a die is generally illustrated in FIGS. 11-13. In an embodiment, the method includes a step of producing a flat face on golf club head 1, as illustrated in FIG. 11. During manufacture of golf club head 1, the club head is generally initially formed by casting or forging and the club head is formed with a face that is intended to be flat. However, because of manufacturing tolerances face 11 is not as flat as may be desired. In order to increase the flatness of face 11, a cutting tool 34 may be used. Cutting tool 34 may be a fly-cutter that is generally rotated along an axis that is substantially normal to the face and then passed laterally across the face to reduce and remove the deviations in the face flatness, as shown. The step of increasing the flatness of face 11 may be performed before or after rough cut grooves 32 are formed in face 11. The process may also be used as a final process after the final groove configuration is created.

FIG. 12 illustrates the creation of rough cut grooves 32 using a cutting tool 36, which is illustrated as a spin mill cutter. Rough cut grooves 32 are grooves that are cut into face 11 that do not have the final desired dimensions. In an embodiment, rough cut grooves 32 having parallel side walls and sharp corners at the edge where the groove interfaces with face 11 are created using a spin mill cutter. If left unaltered, rough cut grooves 32 may not comply with the USGA or R&A rules because the sharp edges at the interface with face 11 would not comply with established rules for edge dimensions. Rough cut grooves 32 may be created by various methods. Preferably, the rough cut grooves are spin milled into the face of club head 1, but they may alternatively be cast, end milled, rough stamped or forged, cut with a laser or water jet, or assembled using material layering. The rough cut grooves may have any desired configuration, such as a U-groove, V-groove or a faceted groove.

Referring to FIG. 13, after club head 1 is provided with rough cut grooves 32, a forming die 38 is pressed into rough cut grooves 32 to alter, or create, features in the rough cut grooves 32 which creates a final groove configuration having tight tolerances and a repeatable configuration. For example, the operation may be used to create a radius or facet in the edge material at the interface between face 11 and the side wall of rough cut groove 32 so that a final desired groove edge is created, such as an edge that conforms to USGA and/or R&A rules. Additionally, or as an alternative, the stamping operation may be used to create side walls that have a desired draft angle or to precisely control the width of each groove. Preferably, using die 38 the tolerance of the edge radius of the grooves may be controlled to +/−0.0005 inch and the tolerance on the draft angle may be controlled to +/−0.2 degrees.

Die 38 includes projections 40 that are pressed into rough cut grooves 32 to shape the material that is adjacent the grooves and that defines the grooves. Projections 40 are precisely shaped so that they shape the material to a desired shape. As a result, when it is desired to manufacture grooves that comply with USGA or R&A rules, using a die allows the manufactured groove dimensions to more closely match the limits of the rules more consistently. In addition, by pressing the material around the groove using die 38, the edges of the groove become work hardened which may increase the wear resistance of the groove. In embodiments using die 38 to alter the sides or edges of the grooves, the length $D_4$ of projections 40 is preferably less than the depth $D_5$ of rough cut grooves 32 so that projection 40 remains spaced from a bottom surface of the groove. However, it should be appreciated that length $D_4$ of projections 40 may be greater than the depth of rough cut grooves 32 if die 38 is used to control the final depth of the grooves or to create features in the bottom surface of the grooves. Furthermore, the process of using die 38 to form the grooves may include using a plurality of dies or multi-piece dies that progressively shape rough cut groove 32 into the final desired configuration.

Figure 14:
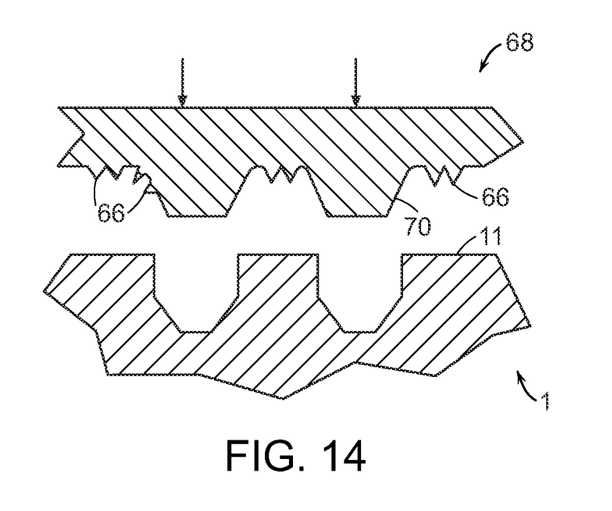
FIGS. 14 and 15 illustrate another embodiment of a step in a method of making grooves in accordance with the present invention.
Figure 15:
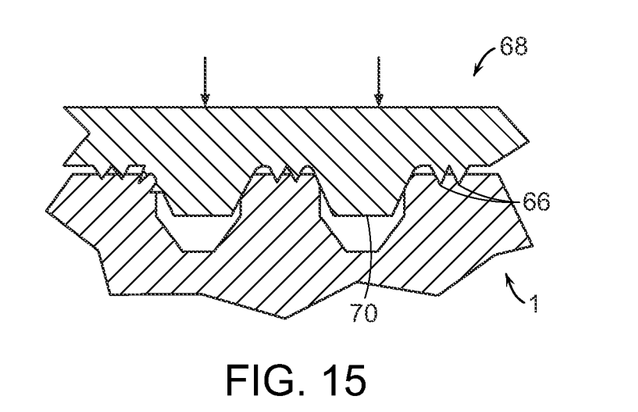

Texturing may also be added to the club head face using a die. Referring to FIGS. 14 and 15, a die 68 includes surface texturing features 66 that are pressed into club head 1 and form surface texturing, or supplement surface texturing from another operation. Texturing features 66 may be included on any portion of die 68 that contacts club head 1. For example, texturing features 66 may be included adjacent projections 70 so that texturing is created on strike face 11 when die 68 is pressed against club head 1. In addition, or as an alternative, surface texturing may be created on an internal portion of the grooves by including texturing features 66 on a corresponding portion of one or more projections 70. In an embodiment, texturing is created in the edge material of one or more grooves at the interface between the strike face 11 and the groove side wall so that texturing is provided on the edge radius or facet. Alternatively, a separate die or die portion, such as in a multi-piece die, may be included that includes texturing features. The texturing features may be pressed into portions of the grooves and/or into the spaces between grooves simultaneously with shaping the grooves or as a separate operation. Face texturing generally includes teeth, ridges, dimples, symbols, dots, numbers, or any other shaped feature that alters the face contour.

The die may be constructed using any precise machining method and is preferably constructed from material having high wear resistance.

FIGS. 6-10 each show a cross-section of a preferred faceted groove 12 that may be formed by the methods described above. The groove 12 includes a first portion 121 adjacent to and interacting with the club face 11. In some embodiments, the edges of the groove 12 have been deburred, either having a radius or being angled. Preferably, the radius or angled edge is created using a spin milling tool that has the feature incorporated into the complementary cutting profile. In embodiments incorporating an angled edge, such as those of FIGS. 6-9, a preferred range of angles $A_1$ is about 10° to 50°. In embodiments incorporating a radiused first portion, the radius is preferably less than 0.015 inch and more preferably less than 0.010 inch. The width $W_1$ of the groove 12 at the strike face 11, which is generally the widest portion of the groove 12 and the maximum groove width, is between about 0.030 inch to about 0.045 inch, and is preferably about 0.035 inch. The width transitions narrower through the first groove portion 121 to a width $W_2$ that is between about 0.033 and about 0.020 inch at the lowermost boundary of the first portion 121, also referred to as the distal end of the first portion 121. The first portions of the illustrated embodiments of FIGS. 6-10 are similar, but extend to varying depths $D_1$. The embodiment illustrated in FIG. 6 has the shallowest depth $D_1$, and the embodiment illustrated in FIG. 10 has the deepest depth $D_1$. The first portion 121 has a depth $D_1$ between about 0.001 and 0.008, preferably having a depth $D_1$ of approximately 0.005 inch, with 0.001 to 0.003 inch being more preferred. In some preferred embodiments, the first portion 121 has a depth $D_1$ that is about 20% to about 40% of the overall groove depth D, and more preferably about 35% of the overall groove depth D. The overall groove depth D preferably is between about 0.0150 and 0.0225 inch, more preferably about 0.02 inch.

The groove 12 includes a second portion 122 adjacent to the first portion 121. Second portion 122 preferably has substantially parallel walls that are substantially perpendicular to the face 11, "substantially" herein meaning the walls may be angled at an angle $A_2$ of up to about 20°. Preferably, the walls defining the second portion 122 are spaced as far apart as possible to maximize the volume of the groove 12. A preferred range of widths $W_2$, $W_3$ is about 0.033 to 0.027 inch. In relative terms, the width $W_2$ at a proximal end of second portion 122 is the maximum width of the second portion 122 and is preferably from about 80% to 98% of the maximum groove width $W_1$. Preferably, the width $W_3$ at a distal end, or the bottom portion, of the second portion 122 is at least about 80% of the width $W_2$ at a top portion of the second portion 122. A preferred range of depths $D_2$ is between about 0.003 inch and about 0.008 inch. In some embodiments, the second section depth $D_2$ is at least half the overall groove depth D. In other embodiments, however, the second portion 122 has a depth $D_2$ that is about 15% to about 35% of the overall groove depth D.

The groove 12 includes a third portion 123 adjacent to the second portion 122 and further distal from face 11. This portion 123 has a V-shape, having angled side walls each having an internal angle $A_3$ of about 35° to about 55°, as measured from a plane normal to face 11. Thus, the width of the third portion 123 decreases from a proximal end, or the top portion thereof (nearest the face 11), to the distal end, or bottom portion thereof. Preferably, the width at the bottom of the third portion is less than about half of the width of the top portion. In some preferred embodiments, the depth $D_3$ of the third portion 123 may be from about 0.006 inch to about 0.015 inch. The depth $D_3$ of the third portion 123 preferably is at least twice the depth $D_2$ of the second portion 122. In some preferred embodiments, the third portion 123 has a depth $D_3$ that is about 35% to about 55% of the overall groove depth D.

The groove 12 includes a fourth portion 124 adjacent to the third portion 123 that extends between the angled side walls of the third portion 123. This portion 124 may be radiused to join the walls of the third section 123. A preferred radius $R_4$ is less than 0.012 inch. In other embodiments, the fourth portion 124 includes a substantially planar portion that extends between the opposite angled side walls of the third portion 123. The planar portion may intersect one or both angled side wall of the third portion 123 at a radius $R_4$. In embodiments including a planar fourth portion 124, the width $W_4$ of that portion is preferably about 0.002 inch to about 0.010 inch, and more preferably about 0.006 inch.

Figure 10:
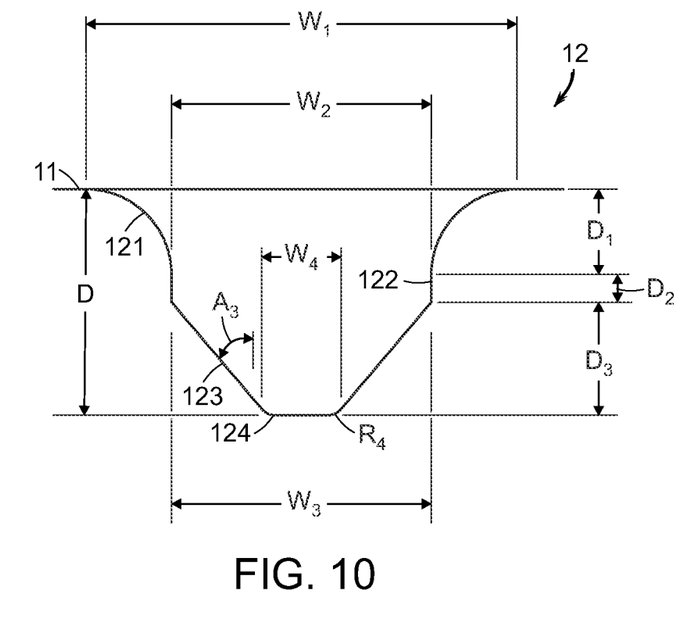

Grooves 12, like the faceted groove shown in FIG. 10, were tested against V-shaped grooves on wedges having a static loft angle of 60° by players hitting golf balls out of the rough. The players had club head swings in a range of 50 mph to 80 mph. The tested V-grooves included angled side walls having an internal angle of about 38°.

For each of the players, the faceted grooves of the present invention increased back spin over the V-grooves. Generally, the spin rate increased between about 8% to about 41% for club head speeds in that range. Table 2 shows the revolutions per minute of a golf ball after being struck with the test club having V-grooves and the test club having grooves of the present invention for various swing speeds.

TABLE 2

| Swing Speed | V-Groove | Faceted Groove | % Increase |
| --- | --- | --- | --- |
| 57 mph | 2480 | 2680 | 8% |
| 65 mph | 2610 | 3690 | 41% |
| 72 mph | 2960 | 3780 | 28% |

Portions of the golf clubs of the present invention may also be hardened to increase wear resistance. As a result, the grooves are more resistant to dimensional changes caused by use. Preferably, the club head material adjacent the grooves is hardened. The hardness is increased by applying extremely high heat to at least a portion of the golf club head and subsequently quenching the golf club head. For example, localized hardening of the material may be accomplished by applying extremely high localized heating, such as with a laser, and subsequently oil quenching the golf club head.

In an embodiment, only the material on a side of each of the grooves nearest a top line of the golf club head is hardened. For example, the golf club head includes a hardened portion that extends from the side of each groove about 0.05 inch toward the top line. The depth of each hardened portion is generally less than or equal to about 0.005 inch deep from the club face. Preferably, the depth tapers from a thickest portion adjacent the groove. In an example, a golf club head constructed of carbon steel having a hardness of about 90 on the Rockwell Hardness B scale and includes localized hardened portions, such as those described above, that have a hardness of about 45 on the Rockwell Hardness C scale.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus, the present invention should not be limited by the above-described exemplary embodiments, but should be defined only in accordance with the following claims and their equivalents.

What is claimed is:

1. A method of making a golf club head, comprising:
providing a golf club head body having a flat metallic ball-striking face and a rough cut groove disposed therein, wherein the maximum depth distance of the rough cut groove is shorter than the overall distance of the rough cut groove;
providing a die having a projection and a plurality of texturing features; and
pressing the projection into the rough cut groove to displace material adjacent the groove to alter the rough cut groove into the final groove by pressing edge material of the rough cut groove into a final groove edge configuration at an interface between the ball-striking face and the groove, and pressing the texturing features into the face to form surface texturing, wherein the rough cut groove contains a longitudinal axis and the rough cut groove is radiused at toe and heel portions of the golf club head about axes of rotation that are perpendicular to the longitudinal axis and parallel to the face.

2. The method of claim 1, further comprising machining the face so that it is substantially flat.

3. The method of claim 1, wherein the step of pressing the projection into the rough cut groove includes displacing edge material at an interface between the rough cut groove and the face.

4. The method of claim 3, wherein the edge material is displaced to form a radius.

5. The method of claim 3, wherein the edge material is displaced to form a facet.

6. The method of claim 3, wherein the edge material is displaced by the texturing features.

7. The method of claim 1, wherein the step of pressing the projection into the rough cut groove includes displacing the material forming side walls of the rough cut groove to form a draft angle.

8. The method of claim 1, wherein at least one texturing feature is provided on a projection.

9. A method of making a golf club head, comprising:
providing a golf club head body having a flat metallic ball-striking face;
forming a rough cut groove in the face;
providing a die having a projection and a plurality of texturing features; and
pressing the projection into the rough cut groove to displace material adjacent the groove to alter the rough cut groove into a final groove configuration by pressing edge material of the rough cut groove into a final groove edge configuration at an interface between the ball-striking face and the groove and pressing the texturing features into the face to form surface texturing,
wherein the step of forming a rough cut groove includes machining the rough cut groove into the face such that the rough cut groove has a maximum depth distance that is shorter than an overall distance of the rough cut groove, and wherein the step of forming a rough cut groove includes machining the rough cut groove into the face such that the rough cut groove contains a longitudinal axis and the rough cut groove is radiused at toe and heel portions of the golf club head about axes of rotation that are perpendicular to the longitudinal axis and parallel to the face.

10. The method of claim 9, further comprising machining the face so that it is substantially flat.

11. The method of claim 9, wherein the step of forming a rough cut groove includes spin milling the groove.

12. The method of claim 9, wherein the step of pressing the projection into the rough cut groove includes displacing edge material at an interface between the rough cut groove and the face.

13. The method of claim 12, wherein the edge material is displaced to form a radius.

14. The method of claim 12, wherein the edge material is displaced to form a facet.

15. The method of claim 12, wherein the edge material is displaced by the texturing features.

\* \* \* \* \*